United States Patent
Schmidl

(10) Patent No.: US 6,598,721 B2
(45) Date of Patent: Jul. 29, 2003

(54) TRANSFER CASE WITH CLUTCH UNIT FOR CONNECTING TWO OUTPUT SHAFTS, AND COUPLING METHOD

(75) Inventor: Dieter Schmidl, Graz (AT)

(73) Assignee: Steyr Powertrain AG & CO KG, Lannach (AU)

( * ) Notice: Subject to any disclaimer, the term of this patent is extended or adjusted under 35 U.S.C. 154(b) by 20 days.

(21) Appl. No.: 10/034,098

(22) Filed: Dec. 19, 2001

(65) Prior Publication Data

US 2002/0074202 A1 Jun. 20, 2002

(30) Foreign Application Priority Data

Dec. 20, 2000 (AT) .......................... 934/2000 U

(51) Int. Cl.⁷ ........................ F16D 23/02; F16D 21/04
(52) U.S. Cl. ...................... 192/48.5; 192/53.1
(58) Field of Search ................. 192/48.5, 53.1, 192/48.7, 48.8, 49, 69, 70.2; 180/247, 233

(56) References Cited

U.S. PATENT DOCUMENTS

| 3,746,137 | A | * | 7/1973 | Ruschke, Jr. | 192/48.5 |
| 4,562,897 | A | * | 1/1986 | Renneker | 180/233 |
| 5,159,847 | A | * | 11/1992 | Williams et al. | 74/337.5 |
| 5,286,238 | A | * | 2/1994 | Shimizu et al. | 475/221 |
| 5,584,776 | A | * | 12/1996 | Weilant et al. | 475/213 |
| 6,079,535 | A | * | 6/2000 | Mueller et al. | 192/48.2 |
| 6,105,702 | A | * | 8/2000 | Showalter | 180/247 |

FOREIGN PATENT DOCUMENTS

JP                 3-172631 A  *  7/1991

* cited by examiner

*Primary Examiner*—Saul Rodriguez
(74) *Attorney, Agent, or Firm*—Bachman & LaPointe, P.C.

(57) ABSTRACT

A transfer case having a clutch unit, to produce a connection between a first output shaft and a second output shaft includes a claw clutch associated with a synchronizer clutch which comprises a first synchronizer part, which is connected in a rotationally fixed manner to the first output shaft, and a second sychronizer part, which is connected in a rotationally fixed manner to a first clutch part.

7 Claims, 2 Drawing Sheets

TRANSFER CASE WITH CLUTCH UNIT FOR CONNECTING TWO OUTPUT SHAFTS, AND COUPLING METHOD

BACKGROUND OF THE INVENTION

The invention relates to a transfer case for the drive train of a motor vehicle, which comprises a clutch unit by means of which it is possible to produce a connection between a first output shaft and a second output shaft.

In all-wheel drive vehicles, with one axle which is constantly driven and one axle whose drive can be connected and disconnected, a first requirement is for it to be possible to connect the second axle when driving, i.e. without interrupting the traction force or without having to stop to do this. A typical off-road situation occurs when, first of all, the wheels of the constantly driven axle start to slip, turning significantly more quickly than the undriven wheels. If the second driven axle is then to be connected without the load being interrupted (before the vehicle gets completely stuck), it is necessary to overcome a considerable difference in rotational speed and a high torque, which is impossible with an ordinary clutch.

A second requirement is economic. If the disengaged drive shaft of the undriven axle is also running, considerable losses and increased wear are generated. To avoid this, the drive train between the second driven axle and the transfer case is shut down. There is already a clutch at one end of the drive train. If a clutch is also fitted at the other end of the drive train, i.e. in or on the second driven axle, this drive train can be shut down. However, if the second axle is to be driven while the vehicle is moving, not only it is necessary to overcome any difference in rotational speed during engagement in the transfer case and to transmit a moment, but also the entire drive train leading to the second axle has to be accelerated from a substantially stationary position.

Finally, a third requirement is that an all-wheel drive vehicle be compatible with electronically controlled brake systems, which for reasons of vehicle dynamics requires rapid and complete release of the connection between the two axle drive trains.

A transfer case of the generic type is known from U.S. Pat. No. 6,079,535. In the clutch unit described in that document, during engagement the first clutch part and the second clutch part, and with the latter also the entire drive train to the second driven axle, are accelerated by axle displacement of the pressure plate which is connected in a rotationally fixed manner to the first output shaft. Only when synchronous running is achieved is the claw clutch engaged, by further displacement of the pressure plate.

The fact that only the pressure plate is driven means that both clutch parts have to be accelerated via the frictional surfaces, during which process initially only that of the pressure plate on the closest disks is subjected to load, but consequently this load is particularly high. This causes noise, is only possible when driving very slowly and overall represents a load situation which is particularly unfavorable for the clutch and leads to rapid and also uneven wear.

When the drive train leading to the second axle is stationary, this solution is particularly disadvantageous, since the entire drive train has to be accelerated by means of initially only a few disks, which given a low surface pressure entails long acceleration times and therefore the risk of the clutch overheating, while if the pressure exerted is high (by means of a particularly strong second spring), the base moment of the multidisk clutch is high. The term base moment is to be understood as meaning the torque which occurs on initial contact of the disks. Consequently, the clutch action is very hard. Furthermore, this high base moment makes interaction with an electronic brake control unit difficult if not impossible, imposes high demands on the control system and during shifting, leads to stresses in the drive train.

Accordingly, it is an object of the invention to counteract these drawbacks and to improve a clutch of the generic type in such a way that it is possible to satisfy all three requirements mentioned above.

SUMMARY OF THE INVENTION

The invention relates to a transfer case for the drive train of a motor vehicle, which comprises a clutch unit by means of which it is possible to produce a connection between a first output shaft and a second output shaft, the clutch unit comprising:

a) a first clutch part, which is mounted rotatably on the first output shaft, can be displaced in the axial direction and has first clutch disks arranged in a rotationally fixed but translationally movable manner thereon, b) a second clutch part, which is mounted so that it rotates coaxially with the first clutch part, is connected in a rotationally fixed manner to the second output shaft and has second clutch disks which are arranged in a rotationally fixed but translationally movable manner thereon, c) a pressure plate which can be displaced axially toward the first clutch part, a first spring being provided between the pressure plate and the first clutch part, d) a claw clutch, comprising a primary part, which is formed on the first output shaft or on a part which is connected in a rotationally fixed manner thereto, and a secondary part, which is formed on the first clutch part or on a part which is connected in a rotationally fixed manner thereto, which parts can be brought into engagement with one another counter to the force of a second spring.

According to the invention, the foregoing object is achieved by the fact that:

e) the force exerted by the first spring is greater than the force exerted by the second spring, and f) the claw clutch is assigned a synchronizer clutch which comprises a first synchronizer part, which is connected in a rotationally fixed manner to the first output shaft, and a second synchronizer part, which is connected in a rotationally fixed manner to the first clutch part.

These two design measures have far-reaching consequences. The fact that the first spring is harder means that initially the first clutch part of the multidisk clutch is only displaced, without its disks coming into contact, (the stronger first spring prevents this from happening). However, the displacement counter to the force of the significantly weaker second spring brings the synchronizer mechanism into action, with the result that only the first clutch part is accelerated and is ultimately connected to the first output shaft via the claw clutch. Only then is the multidisk clutch closed gently and uniformly by further displacement of the pressure plate.

In this arrangement, the pressure plate is preferably guided in only an axially displaceable manner on the first clutch part. Since, because of the invention, a rotationally fixed connection to the first output shaft is not required, the pressure plate is at this point not itself transmitting any torque. Consequently, it can be of lighter and smaller design.

In a preferred embodiment, the first clutch part is inside the second clutch part and bears the inner disks, and the second clutch part is designed as a bell with adjoining second output shaft, the second output shaft being a hollow shaft mounted on the first output shaft. The lower moment of inertia of the first clutch part means that the time required for synchronization is shorter, and a design which is more favorable both with regard to the space required and with regard to the accessibility of the actuator is achieved. The same purpose is served if the claw clutch is arranged on that side of the first clutch part which is remote from the pressure plate.

To ensure that there is no drag torque produced in the multidisk clutch even under unfavorable conditions, and nevertheless to have short idle travels during actuation, the first spring is prestressed.

However, the invention also relates to a method for engaging a clutch unit, by means of which it is possible to produce the connection between a first output shaft and a second output shaft, the clutch unit comprising a multidisk clutch and a claw clutch with synchronizer clutch, the multidisk clutch comprising a first clutch part, which is mounted rotatably on the first output shaft, a second clutch part, which is connected in a rotationally fixed manner to the second output shaft, and the claw clutch comprising a primary part, which is formed on the first output shaft and a secondary part which is formed on the first clutch part or on a part which is connected in a rotationally fixed manner thereto.

The method according to the invention is intended to ensure that the three requirements mentioned in the introduction can be satisfied. It comprises the following steps:
  a) firstly, the first output shaft accelerates the first clutch part by means of the synchronizer device,
  b) when first output shaft and first clutch part are running synchronously, the claw clutch is engaged,
  c) then, the multidisk clutch is used to couple the second output shaft to the first output shaft.

This procedure leads to the quickest possible connection of the second output shaft with minimal wear and the smallest possible requirement for space, as a result of the second drive train being connected, as it were, "by installments", the individual installments also being optimally adapted to the prevailing conditions. By way of example, the lower moment of inertia of the first clutch part is accelerated using the smaller clutch, namely the synchronizer clutch.

A refinement of the method for engaging a clutch unit, with the first output shaft rotating and the second output shaft substantially stationary, consists in the fact that with the first output shaft rotating and the second output shaft substantially stationary, the second output shaft is only accelerated to the rotational speed of the first output shaft during coupling by means of the multidisk clutch. Consequently, the drive train of the second driven axle is brought up to speed within the shortest possible time.

BRIEF DESCRIPTION OF THE DRAWINGS

In the text which follows, the invention is described and explained with reference to a diagrammatic illustration of a preferred exemplary embodiment. In the drawing.

DETAILED DESCRIPTION

Figure 1:
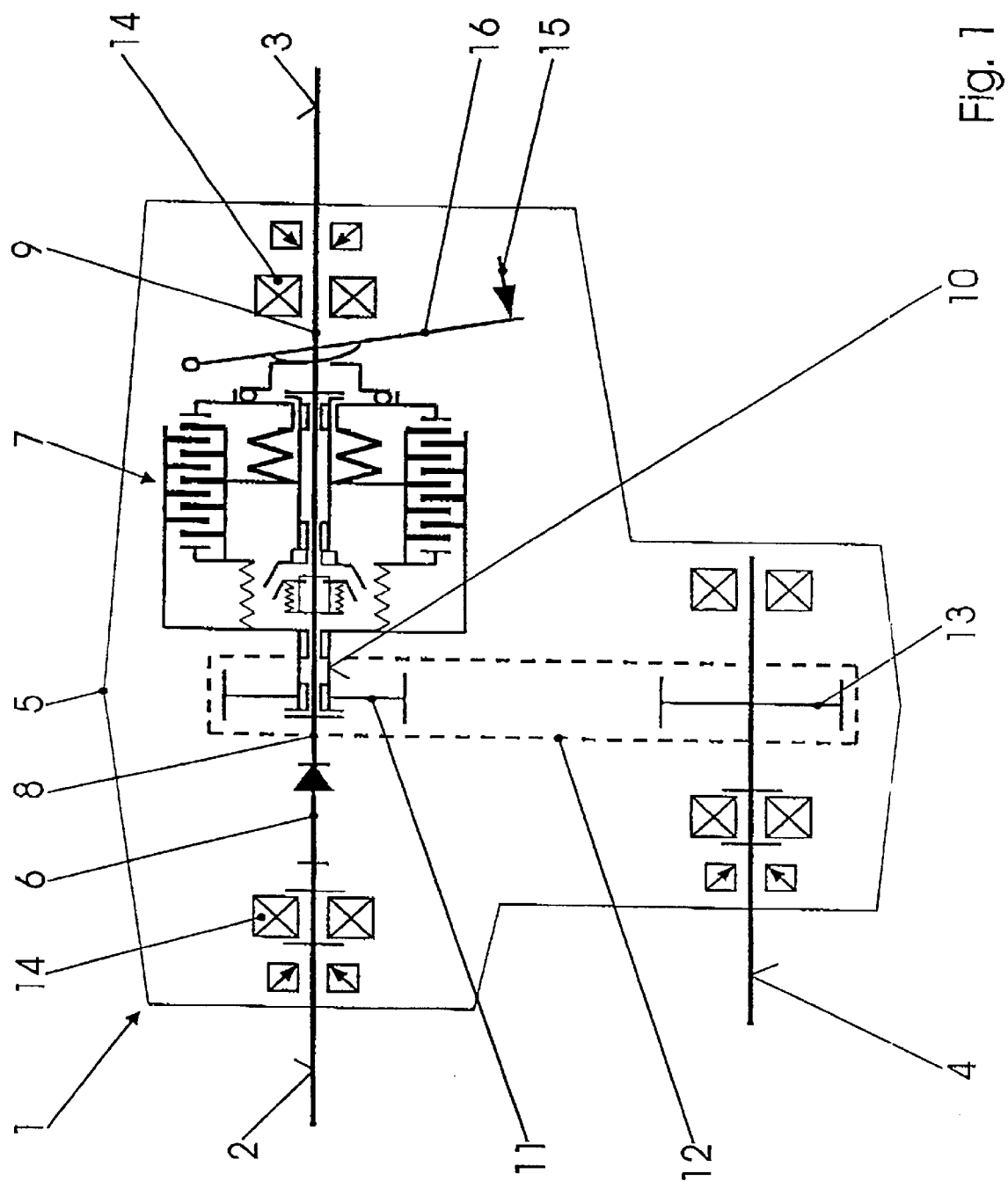
FIG. 1 shows a transfer case according to the invention.

In FIG. 1, the transfer case is denoted overall by 1. It is connected to an engine transmission block via an input shaft 2, to a first, permanently driven axle via a first drive train 3 and to a second axle, the drive of which can be connected and disconnected, via a second drive train 4. Engine transmission block and axles are not shown. The housing 5 is only indicated. It may also include a reduction stage, which is only indicated by the arrow 6.

A clutch unit 7 is provided for the purpose of connecting up the second drive train 4. This unit has a drive shaft 8, a first output shaft 9 leading to the first drive train 3 and a second output shaft 10 leading to the second drive train 4. In the exemplary embodiment illustrated, drive shaft 8 and first output shaft 9 are combined to form a continuous shaft, while the second output shaft 10 is designed as a hollow shaft on which a driving wheel 11 is positioned, which in this case, via a chain or a tension belt 12, drives a driven wheel 13, to which the second drive train 4 is connected. Bearings 14 of the drive shaft 8 and/or the first output shaft 9, an actuator 15 and a pressure lever 16 connected thereto are also indicated.

As an alternative to the tension belt 12, transmission by means of gearwheels or other force-transmission elements may also be provided. The clutch unit 7 could also be driven from the driven wheel 12 and be arranged at the level of the second drive train, in which case the first drive train 3 would also be at the level of the second drive train 4.

The second drive train 4 leading to the second driven axle can be shut down altogether with the clutch unit 7 disengaged, if a clutch, which is shifted at a time which is adapted to that of the clutch unit 7, is also provided in the second driven axle.

Figure 2:
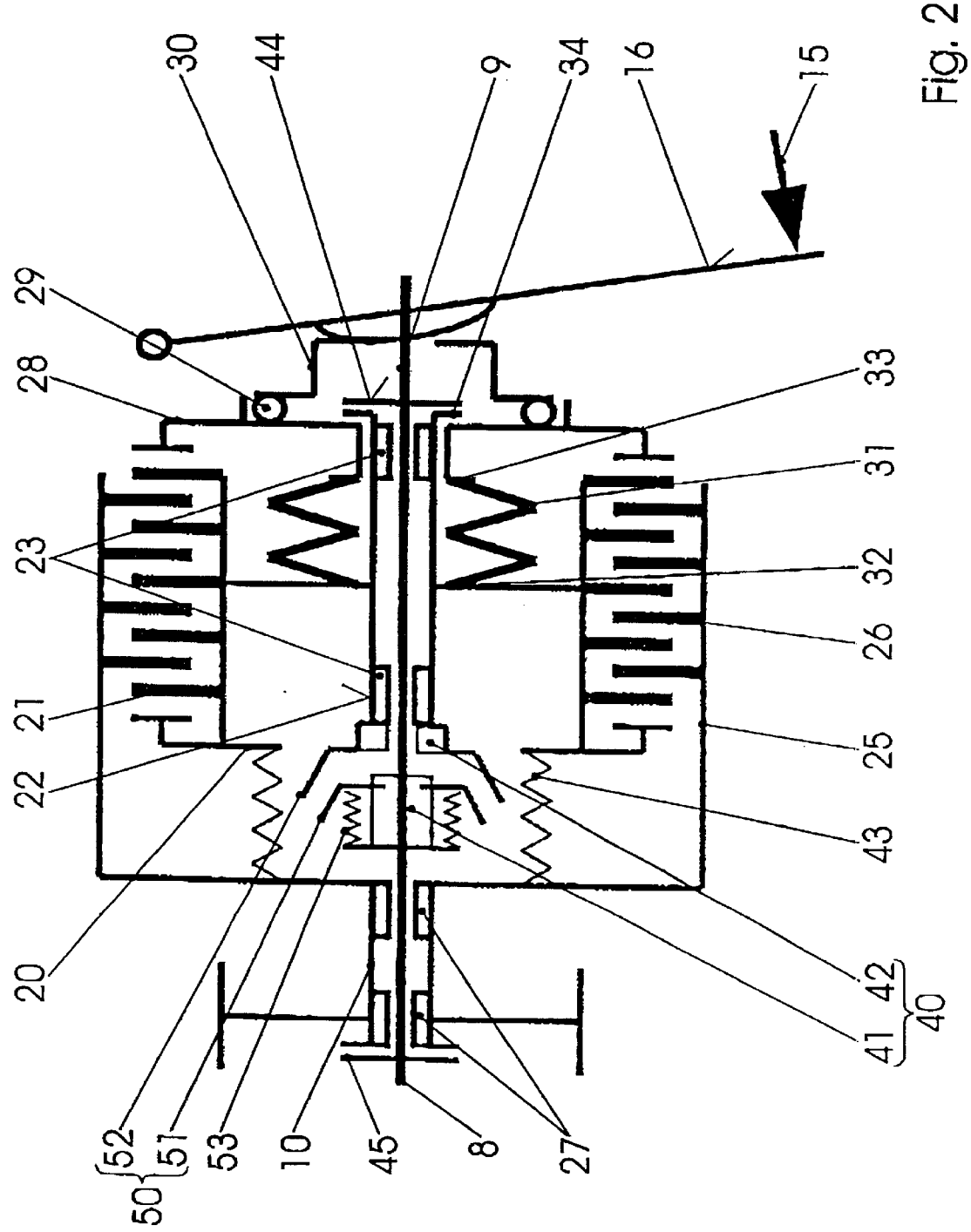
FIG. 2 shows the clutch unit therein, in an enlarged illustration.

The clutch unit 7 will now be described with reference to FIG. 2. It comprises, firstly, a first clutch part 20 and a second clutch part 25. The first clutch part 20 is in this case arranged inside the second clutch part 25 and carries first clutch disks 21 in a rotationally fixed but axially displaceable manner. The first clutch part, which in this figure is only diagrammatically illustrated without its actual body being shown, has a hub 22, which is mounted in a rotatable and axially displaceable manner on the first output shaft 9 in first bearings 23. The second clutch part 25, with second clutch disks 26 which are rotationally fixed and axially displaceable, forms a bell which is connected in a rotationally fixed manner to the second output shaft 10 or is integral therewith and is mounted on the drive shaft 8 or on the first output shaft 9 by means of second bearings 27.

A pressure plate 28, which is acted on via an axle bearing 29 and a nonrotating pressure piece 30 of the actuator 15 via the pressure lever 16, is provided on the first clutch part 20, connected in an axially displaceable and not rotationally fixed manner. A first spring 31 is arranged between the pressure plate 28 and the first clutch part 20. This spring is a compression spring, in this case in particular a set of disk springs, and is very strong. Its left-hand end 32 is supported on the first clutch part 20, and its right-hand end 33 is supported on the pressure plate 28, and the spring is prestressed, for which reason a first stop collar 34 is provided on the hub 22 of the first clutch part 20.

Furthermore, the clutch unit 7 includes a claw clutch 40 on the side remote from the pressure plate 28. This claw clutch comprises a primary part 41 and a secondary part 42, it being possible for the claws to be designed in any suitable way. The primary part 41 is fixed in terms of rotation and displacement on the first output shaft 9 and/or the drive shaft 8, the secondary part 42 is arranged on the first clutch part 20 in such a manner that it is rotationally fixed and can be displaced with this clutch part in the axial direction, counter to the force of a second spring, a compression spring 43. The second spring 43 presses the first clutch part 20 to the right, until it comes into contact with a second stop collar 44 on the first output shaft. It is weaker than the first spring 31. This claw clutch 40 is engaged by displacement of the first clutch part 20 to the left, counter to the force of the second spring 43. In order to absorb the axial force acting on the first output shaft 9 in this way, a third stop collar 45, which is supported on the second output shaft 10, is provided on the left-hand side of the clutch unit 7.

Finally, the clutch unit 7 also includes a synchronizer device 50 which is associated with the claw clutch 40 and comprises a first synchronizer part 51 and a second synchronizer part 52, of which the first synchronizer part 51 is connected in a rotationally fixed manner to the primary part 41 and the second synchronizer part 52 is connected in a rotationally fixed manner to the secondary part 42 of the claw clutch 40. The first synchronizer part 51 can be displaced counter to the force of one or more synchronizer springs 53. This synchronizer mechanism operates in the standard way: if the two parts 41, 42 of the claw clutch 40 are moved toward one another, first of all first and second synchronizer parts 51, 52 come into contact with one another under a frictional lock, the frictional force being dependent on the force of the synchronizer springs 53, until they are running synchronously. Until then, the first synchronizer part 51 is retracted to such an extent that the secondary part 42 of the claw clutch 40 can engage in a positively locking manner in its primary part 41.

Engagement during driving, in particular when the secondary drive train 4 is stationary, takes place as follows: when the actuator 15 is actuated, the pressure plate 28 is moved to the left, as seen in the figures. Since the first spring 31 is considerably stronger than the second spring 43, as a result the entire first clutch part 20, which in the most extreme situation is stationary, is displaced to the left, until the two synchronizer parts 51, 52 come into contact with one another under a frictional lock. This frictional lock causes initially only the first clutch part 20 to be accelerated, until it has reached the rotational speed of the first output shaft 9, and then, as a result of further displacement of the first clutch part 20, the primary part 41 is brought into engagement with the secondary part 42 of the claw clutch 40. As a result, the first clutch part 20 is coupled in a positively locking manner to the first output shaft 20. Since the first clutch part 20 can then no longer be displaced further to the left, under continuing action of the actuator 51 the pressure plate 28 is pressed onto the disks 21, 26 of the multidisk clutch, counter to the considerable force of the first spring 31. Then, by means of this multidisk clutch, the second clutch part 25 is accelerated until it too, and also the second output shaft, have reached the rotational speed of the first output shaft. During rapid release of the clutch, for example in the event of an ABS braking operation, first of all the multidisk clutch 20, 25 opens completely, on account of the strong first spring 31, on account of the very low base moment produced by the invention, with the result that the two drive trains are completely decoupled, virtually without any residual moment. In the event of an ABS braking operation, the claw clutch 40 is no longer released, so that at the end of this operation, the clutch can also be closed again very quickly. If the operating mode is changed through the intervention of the driver, the claw clutch is also actuated first during engagement and last during disengagement.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A transfer case for the drive train of a motor vehicle, which comprises a clutch unit by means of which it is possible to produce the connection between a first output shaft and a second output shaft, the clutch unit comprising:
   a) a first clutch part, rotatably mounted on the first output shaft and displaceable in an axial direction and having first clutch disks arranged in a rotationally fixed but translationally movable manner thereon,
   b) a second clutch part, mounted for coaxial rotation with the first clutch part and connected in a rotationally fixed manner to the second output shaft and having second clutch disks which are arranged in a rotationally fixed but translationally movable manner thereon,
   c) a pressure plate displaceable axially toward the first clutch part, a first spring being provided between the pressure plate and the first clutch part,
   d) a claw clutch, comprising a primary part rotatable with the first output shaft, and a secondary part rotatable with the first clutch part wherein the primary part and secondary part are selectively brought into engagement with one another counter to the force of a second spring, wherein
   e) the force exerted by the first spring is greater than the force exerted by the second spring, and
   f) the claw clutch is associated with a synchronizer clutch which comprises a first synchronizer part, which is connected in a rotationally fixed manner to the first output shaft, and a second synchronizer part, which is connected in a rotationally fixed manner to the first clutch part.

2. The transfer case with clutch unit as claimed in claim 1, wherein the pressure plate is guided in an axially displaceable manner on the first clutch part.

3. The transfer case with clutch unit as claimed in claim 1, wherein the first clutch part is inside the second clutch part and carries the inner disks, and wherein the second clutch part is designed as a bell with adjoining second output shaft, the second output shaft being a hollow shaft mounted on the first output shaft.

4. The transfer case with clutch unit as claimed in claim 1, wherein the claw clutch is arranged on a side of the first clutch part which is remote from the pressure plate.

5. The transfer case with clutch unit as claimed in claim 1, wherein the first spring is prestressed.

6. A method for engaging a clutch unit, by means of which it is possible to produce the connection between a first output shaft and a second output shaft, the clutch unit comprising a multidisk clutch and a claw clutch with synchronizer clutch, the multidisk clutch comprising a first clutch part, which is mounted rotatably on the first output shaft, a second clutch part, which is connected in a rotationally fixed manner to the second output shaft, and the claw clutch comprising a primary part, which is formed on the first output shaft, and a secondary part formed on the first clutch part, in which method the following steps are carried out:
   a) firstly, the first output shaft accelerates the first clutch part by means of the synchronizer device,
   b) when first output shaft and first clutch part are running synchronously, the claw clutch is engaged,
   c) therefore, the multidisk clutch couples the second output shaft to the first output shaft.

7. The method for engaging a clutch unit as claimed in claim 6, with the first output shaft rotating and the second output shaft substantially stationary, wherein the second output shaft is only accelerated to the rotational speed of the first output shaft during coupling by means of the multidisk clutch.

* * * * *